United States Patent [19]

Bocard et al.

[11] 4,182,677

[45] Jan. 8, 1980

[54] MODIFIED RUBBER, ITS USE AS HYDROCARBON ABSORBER

[75] Inventors: Christian Bocard, Orgeval; Philippe Renault, Noisy le Roi; Henri Séris, Rueil Malmaison; Claude Gatellier, Boulogne, all of France

[73] Assignee: Institut Francais du Petrole, Rueil-Malmaison, France

[21] Appl. No.: 836,252

[22] Filed: Sep. 23, 1977

Related U.S. Application Data

[63] Continuation-in-part of Ser. No. 671,712, Mar. 29, 1976, abandoned.

[30] Foreign Application Priority Data

Apr. 3, 1975 [FR] France .............................. 75 10993
Jan. 28, 1976 [FR] France .............................. 76 02507

[51] Int. Cl.² .............................................. C02B 9/02
[52] U.S. Cl. ........................................ 210/36; 210/40; 210/DIG. 26
[58] Field of Search .................... 210/24, 30 A, 32, 36, 210/40, 502, DIG. 26; 134/7; 252/413, 414

[56] References Cited

U.S. PATENT DOCUMENTS

| | | | |
|---|---|---|---|
| 2,333,142 | 11/1943 | Behrman | 210/24 |
| 2,367,384 | 1/1945 | Tymstra et al. | 210/36 |
| 2,632,012 | 3/1953 | Boldingh | 210/40 |
| 3,567,660 | 3/1971 | Winkler | 210/40 |
| 3,756,948 | 9/1973 | Weinberg | 210/36 |
| 3,966,597 | 6/1976 | Omori et al. | 210/DIG. 26 |

FOREIGN PATENT DOCUMENTS 49-5894 1/1974 Japan .............................. 210/DIG. 26

*Primary Examiner*—Charles N. Hart
*Assistant Examiner*—Ivars Cintins
*Attorney, Agent, or Firm*—Millen & White

[57] ABSTRACT

Process for absorbing hydrocarbons or organic solvents, particularly in solution or suspension in water at a low concentration, by means of an absorption mass consisting of rubber particles of from 0.1 to 3 mm, subjected to a treatment with an organic or inorganic acid or an aqueous solution or emulsion thereof.

26 Claims, No Drawings

MODIFIED RUBBER, ITS USE AS HYDROCARBON ABSORBER

This application is a continuation-in-part of our prior application Ser. No. 671,712, filed Mar. 29, 1976, now abandoned.

This invention concerns a new process for absorbing hydrocarbons or organic solvents. A first application relates to the purification of aqueous oily effluents. The process of the invention may be applied to waters containing hydrocarbon compounds dissolved and/or emulsified in the form of an emulsion of the oil-in-water type.

The petroleum industry produces hydrocarbon containing aqueous effluents which must be purified before being either reused or discharged in natural media. Examples of such waters are: waters from oil fields, washing waters from tankers, refinery waste waters and waters from storage tanks.

The laws concerning the discharge of waters in natural media are not the same in each country, but, in most cases, the hydrocarbon content of these waters must be lower than 20 parts per million, the determination of said content being effected by infrared spectrography.

The adsorption on activated carbon is an efficient technique for purifying waters containing organic compounds; particularly, waters containing dissolved or dispersed hydrocarbons may be treated in that way. However, the relatively high cost of activated carbon makes it necessary, for economical reasons, to proceed to a continuous recycling of the saturated carbon after thermal or chemical regeneration thereof. The use of this costly technique is therefore limited to cases which are difficult to solve by other techniques or to finishing treatments.

It is a first object of the present invention to provide a process for purifying aqueous effluents containing dissolved and/or dispersed hydrocarbons.

The invention may be applied to effluents of any hydrocarbon content, but it is obviously preferable to use it for treating effluents already subjected to a primary de-oiling by gravitation in order to avoid the use of excessive amounts of absorbing material. The invention thus preferably concerns the treatment of effluents containing less than 2 grams of hydrocarbons per liter of water.

A second object of the invention concerns the protection of the soils and waters accidentally or repeatedly polluted by oils, greases and various organic solvents. For this purpose the process of the invention consists of swelling rubbers with water whereby it is possible to increase the power of said rubbers to absorb oils, greases and various organic solvents.

The industrial or home use of petroleum hydrocarbons may produce, as a result of accidents of various origins or for reasons inherent to an industrial activity, the spreading over the soils or waters of such products as fuels or lubricating oils.

A preventive and curative technique for the protection and cleaning of soils and waters, either polluted or liable to be polluted by hydrocarbons, consists in the use of materials capable of absorbing said hydrocarbons, which materials are spread over the surface to be protected or cleaned.

Many materials have been proposed, and in particular the use of natural or synthetic rubber particles for absorbing hydrocarbons has been known since a long time. These particles may be used as such or after swelling by means of hydrocarbons.

An object of the invention is to increase the absorbing power of the rubber particles with respect to hydrocarbons, oils, greases and organic solvents.

Another object is to employ absorbents for hydrocarbons, greases and organic solvents resulting in an increased safety during storage.

A practical advantage of this invention for absorbing hydrocarbons spread over a soil or a water body, lies in the fact that a certain amount of rubber containing material will absorb, after swelling with water according to this process, a larger hydrocarbon amount than will absorb the same amount of non-treated material.

In this invention, we use inexpensive rubber waste as absorbing material. It is known that natural rubber and various types of synthetic rubbers tend to swell when they are contacted with hydrocarbons. However, this property is generally insufficient for justifying the use, under satisfactory economical conditions, of rubber waste as absorber for hydrocarbons contained in water.

It has been discovered that it is possible to make use of rubbers in an economical manner to absorb hydrocarbons or organic solvents, provided that the rubber particles are preliminarily treated by means of a mineral or an organic acid.

For the purpose of the invention, there is meant by rubber a material consisting of a polymer or copolymer of olefin or diolefin (optionally substituted, e.g. with a phenyl radical, one or more halogen atoms, one or more CN or COOR groups in which R is a hydrocarbyl group) or a mixture of polymers or copolymers of these compounds, with the optional addition of an inert mineral filler and/or a reinforcing filler such as carbon black, and which has been subjected to a vulcanization treatment. This rubber may contain any product capable of improving the quality of the rubber as finished product. The gum content of the rubbers used in this invention may be from 10 to 100%, but it is preferred to use a rubber containing from 30 to 90% of gum.

The treatment of the invention may, for example, be applied to natural rubber, synthetic rubber, rubbers containing polybutadiene, styrene-butadiene copolymers, butyl rubber, nitrile rubber, acrylic rubber, ethylene-propylene copolymers, polymers or copolymers of chlorinated or cyano-olefins or diolefins.

There can also be used advantageously for economical reasons, waste products from new or used rubber i.e. waste products from the manufacture of rubber shaped articles or waste products from the recovery of already used rubber articles, such for example as used tires.

By vulcanization it is meant a treatment whereby the raw gum or the raw polymer or copolymer may be converted to a material having satisfactory elastic and mechanical properties and a low plasticity. This treatment is well known and the invention is not limited to a particular type of treatment. For example, it is possible to vulcanize by means of sulfur, sulfur chloride, peroxides, quinones or other mineral or organic compounds, or by means of radiations.

It has been found advantageous to use rubber waste in the form of particles obtained by cutting these waste products to bits. This cutting to bits may be performed in efficient crushers or by grinding the rubber waste after cooling thereof at very low temperature, for example in liquid air. The resulting rubber particles have a grain size from about one micron to a few millimeters. It has been observed that the particles of a size greater than 0.1 millimeter, show many discontinuities which constitute a morphological feature very favourable for the purpose of the invention. Another very favorable feature is the high specific surface of the obtained particles.

Although the size of the particles used according to the invention may vary within a wide range, it is preferred to use particles of a size from 0.1 mm to 3 mm. As a matter of fact, the use of very fine particles makes it more difficult to separate the rubber from the aqueous phase after absorption of the hydrocarbons. On the other hand, the use of large particles is not favourable economically, due to their lower power of hydrocarbon absorption.

We preferably use rubber in the form of a powder whose grains have a size ranging from 0.1 to 1 mm.

As above-mentioned, it has been discovered that it is possible to increase the absorption power of the rubber particles by previously treating them with a mineral or organic acid. According to a preferred embodiment, the rubber particles are stirred in suspension in pure acid or acid diluted for example in water, at a temperature preferably from 0° to 150° C., for a time from 15 minutes to 12 hours. After filtration, the rubber particles may be washed with water in order to remove the free acid.

As organic acid, convenient for the treatment of rubber particles, there can be used, for example: formic acid, acetic acid, trichloracetic acid, trifluoracetic acid, propionic acid, butyric acid and more generally, any acid adapted to perform the treatment in the above-mentioned conditions.

As mineral acid, there can be used, for example, hydrofluoric acid, hydrochloric acid, hydrobromic acid, hydroiodic acid, sulfuric acid, phosphoric acid, nitric acid. These acids will be preferably used in the form of an aqueous solution containing about 0.1 to 10 moles of acid per liter of water.

When using sulfuric acid aqueous solutions, the process is limited to the use of substantially non-sulfonating conditions.

Sulfonation is avoided when using mild operating conditions, i.e. relatively low temperature, relatively low concentration and relatively low contact time, as opposed to relatively high temperature, relatively high concentration and relatively high contact time. The determination of non-sulfonating conditions may require some experimentation, which is within the ordinary skill of one in the art. Preferred conditions with sulfuric acid aqueous solutions include a temperature of about 0°–100° C. for about 15 minutes to 3 hours, at a sulfuric acid concentration of 0.1 to 10 moles of acid per liter of water.

There can also be used aqueous solutions of sulfuric acid obtained as waste products from certain chemical industries.

According to a preferred mode of operating the invention, the rubber waste is stirred in suspension in the aqueous phase to be purified so as to favor the contact between the hydrocarbons dissolved or emulsified in water, and the rubber. The stirring may be performed by means of a mechanical stirrer or through a convenient shaping of the contact apparatus; in the latter case the power required for the distribution of the rubber particles through the whole liquid mass is provided by the treated effluent itself. At the outlet from the contact apparatus, the effluent is supplied to a separator in which the rubber particles, impregnated with hydrocarbons, are separated from the purified aqueous phase; it is advantageous to use rubber waste of a density lower than 1.5 so that, after hydrocarbon absorption, the rubber particles naturally rise up to the surface of the aqueous phase in the separator. In order to facilitate the separation of the rubber particles from the purified effluent, the separator may consist of an air flotation cell. After separation, the rubber particles may be recycled to the contact apparatus in order to completely use their power to absorb hydrocarbons.

In another embodiment, a certain proportion of rubber particles is maintained suspended in the liquid phase contained in the contact apparatus until the rubber particles are saturated with hydrocarbons.

At that time, they are separated from the liquid phase and the apparatus is charged with fresh particles.

According to another embodiment of the invention, the rubber particles are arranged in fixed bed through which passes the effluent to be purified.

Irrespective of the particular embodiment of the invention, the purpose is obviously to make use to the greatest extent of the absorption power of the rubber particles which may thereafter be sent to a combustion furnace. It is worthwhile to note in this connection that the use of rubber particles to absorb hydrocarbons from water has the advantage of producing a combustible material of low water content.

When using according to the invention an inorganic acid either pure or in aqueous solution or a pure organic acid not diluted in water, swelling of rubber is usually not observed. On the contrary, when using a solution or an aqueous dispersion of an organic acid, a substantial swelling of the rubber is observed. This observation suggests a second embodiment consisting of treating rubber particles by means of an aqueous solution or emulsion of an organic acid. It has been discovered that the treatment of rubber particles by means of an aqueous solution or emulsion of organic acid results in the swelling of the particles by absorption of said aqueous solution, the so-treated rubber particles exhibiting an increased absorption power with respect to oily substances and solvents, particularly with respect to hydrocarbons.

It is an advantage of the rubber particles swelled with water to be uninflammable as long as they have not lost their water by evaporation and this is a factor of security for storage which is appreciated by the user.

The swelling of rubber particles with water, according to the invention, is performed by contacting said particles with an aqueous solution or emulsion of an organic acid, preferably containing from 0.1% to 80% b.w. of said acid, at a temperature from 0° C. to 100° C. and preferably higher than 50° C. in order to reduce the contact time necessary to the swelling. When operating under pressure, it is possible to proceed at a temperature above 100° C., for example from 100° to 200° C.

The ratio by weight of the rubber to the aqueous solution will be so selected that at least 1% b.w. of the acid, expressed with respect to the rubber, be in solution or emulsion, but it is preferred to use at least 10% by weight of acid in order to obtain the optimum swelling.

The organic acids used according to the invention, either as such or as mixture, are saturated or unsaturated, linear or branched mono- or di-carboxylic acids having from 1 to 20 carbon atoms and whose molecule may contain, in addition to the carboxylic acid groups, one or more oxygen containing groups such as ketone, ester and alcohol groups. When they are not sufficiently soluble in water, they can be used as emulsions.

Examples of useful acids are: formic, acetic, propionic, butyric, caproic, caprylic, palmitic, stearic, acrylic, crotonic, methacrylic, oleic, linoleic, linolenic, eleostearic, ricinoleic, benzoic, toluic, naphthoic, oxalic, malonic, succinic, glutaric, adipic, phthalic, glycolic, lactic, citric, malic, tartric and pyruvic acids.

The acid aqueous solution used for swelling the rubber particles may advantageously contain from 0 to 90% (preferably 10 to 80%) by weight of polyols such as ethyleneglycol, glycerol or polyethyleneglycol, as well as esters of said polyols with the one or more acids used. The presence of said compounds has the effect of reducing the weight loss of the rubber particles when dried after swelling.

As already stated, the particles of the invention have an absorption power with respect to hydrocarbons higher than that of the raw particles. For identical particles of a rubber of a given type, the absorption power is the greater when the amount of absorbed aqueous solution is the higher.

The following non-limitative examples illustrate the absorbing properties of the rubber particles, raw or treated, with respect to hydrocarbons.

EXAMPLES 1 AND 2 (COMPARATIVE EXAMPLES)

The treatment is applied to 1 liter of water containing 200 mg of hydrocarbon mixture corresponding to gas oil of the paraffinic type, dispersed in water in the form of an emulsion such that the oil droplets have a diameter lower than 15 microns.

400 mg of waste products from rubber of technical grade based on natural rubber, containing 75% of gum and having a density of 1.10, is introduced therein.

Stirring is performed for 30 minutes at room temperature in order to ensure a sufficient contact between the rubber and the emulsion.

The rubber is thereafter separated from the aqueous phase, for example by filtration, and the hydrocarbons remaining in this phase are extracted with carbon tetrachloride and the hydrocarbon concentration is determined by infra-red spectrography after a preliminary gauging.

In example 1, rubber is used in the form of grains of a size from 1 to 4 mm. After stirring for 30 minutes, the residual concentration of hydrocarbons in the aqueous phase is 145 mg per liter.

In example 2, we use rubber previously crushed to a powder whose particle size ranges from 0.1 to 1 mm. After 30 minutes of stirring, the residual concentration of hydrocarbons in the aqueous phase is 15 mg per liter.

EXAMPLE 3 (COMPARATIVE EXAMPLE)

1 liter of water in which is dissolved 90 mg of ethylbenzene, is treated with 400 mg of rubber identical to that used in example 2. After one hour of stirring, we proceed like in the preceding examples and it is observed that 35 mg of ethylbenzene is present in the aqueous phase.

EXAMPLE 4

In 500 ml of a normal aqueous solution of hydrochloric acid, we maintain in suspension, under slight stirring for 3 hours, at ordinary temperature, 10 g of crushed rubber identical to that used in example 2. After filtration, washing with water and drying, there is recovered 9.6 g of rubber.

The experiment described in example 3 is repeated with 400 mg of so-treated rubber.

The residual concentration of ethylbenzene in the aqueous phase amounts to 18 mg per liter.

EXAMPLES 5 (COMPARATIVE) AND 6

We stir for 5 hours an emulsion consisting of 1 g of a hydrocarbon mixture corresponding to a gas-oil of the paraffinic type, in 1 liter of water with 50 mg of rubber. The residual concentration of hydrocarbons is then determined as in example 1.

In example 5 we use crushed rubber identical to that used in example 2. The residual hydrocarbon content of the water amounts to 690 mg per liter of water, which corresponds to an absorption power of 6.2 g of hydrocarbons per gram of rubber.

In example 6, we use the same rubber as in example 4. The residual hydrocarbon content of water amounts to 395 mg per liter of water, which corresponds to an absorption power of 12.1 g of hydrocarbons per gram of rubber.

EXAMPLE 7

In 250 ml of acetic acid at reflux, we stir for two hours 10 g of crushed rubber particles, identical to those used in example 2. After washing with water, 9.5 g of rubber is recovered.

The test described in examples 5 and 6 is repeated with 50 mg of rubber particles, treated with acetic acid. The residual hydrocarbon content amounts to 380 mg per liter of water, which corresponds to an absorption capacity of 12.4 g of hydrocarbons per gram of rubber.

EXAMPLE 8

The process is performed in a contactor consisting of a vessel provided with a lateral outlet pipe provided for maintaining a constant liquid volume of 350 ml. In suspension is maintained therein, by stirring of the liquid phase, 350 mg of rubber particles treated with acetic acid, identical to those of example 7. The rubber particles are maintained in the contactor by means of a grid placed on the outlet pipe and having meshes of 0.1 mm.

The contactor is fed with an aqueous emulsion of gas oil containing 225 mg of hydrocarbons per liter of water, at a flow rate of 1 liter per hour. Each two hours, there is recovered 100 ml of effluent from the contactor, the hydrocarbon content of which is determined. The results are reported in the following table:

| t (hours) | 2 | 4 | 6 | 8 | 10 |
|---|---|---|---|---|---|
| Hydrocarbon content (mg per liter of water) | 22 | 18 | 17 | 19 | 18 |

The test is discontinued after 10 hours. It is observed that, at this time, the effluent still contains less than 20 mg of hydrocarbon per liter of water.

When stirring is stopped in the contactor, the rubber particles rise up to the water surface and can be easily skimmed. The separation is facilitated by sending the aqueous phase with the suspended rubber particles into an air flotation cell.

EXAMPLE 9

We stir for 2 hours, at ordinary temperature, 10 grams of rubber powder identical to that used in example 2, with 250 ml of a 2 N nitric acid solution. After filtration, washing with water and drying, there is recovered 9.6 g of rubber particles.

The test described in example 8 is repeated with 350 mg of these rubber particles treated with nitric acid.

The hydrocarbon content of the resulting effluent, measured versus time is as follows:

| t (hours) | 2 | 4 | 6 | 8 | 10 |
|---|---|---|---|---|---|
| Hydrocarbon content (mg per liter of water) | 23 | 20 | 16 | 18 | 18 |

At the end of the test, rubber particles which have absorbed 5.85 times their hydrocarbon weight, are separated and thereafter used in a test of the same type by passing over the catalyst 0.5 liter per hour of an effluent containing 750 mg of emulsified hydrocarbons per liter of water.

The hydrocarbon content of the resulting effluent, measured after 2 hours, 4 hours and 6 hours is 255, 278 and 292 mg/liter respectively. At the end of the test, 350 mg of rubber have absorbed as a whole about 3.48 g of hydrocarbons.

EXAMPLE 10

10 g of crushed rubber powder, identical to that used in example 2, is stirred for 1 hour with 250 ml of formic acid at reflux. After filtration, washing with water and drying, 9.4 g of rubber particles is recovered.

500 mg of this rubber is used for purifying an aqueous effluent having dissolved or dispersed therein 60 mg of ethylbenzene and 120 mg of a hydrocarbon mixture corresponding to a gas-oil of the paraffinic type, per liter.

This effluent feeds, at a rate of 1 liter per hour, a contactor in which the rubber particles are maintained in suspension in 350 ml of liquid phase, by means of a stirrer. At the outlet from the contactor, the effluent having rubber particles suspended therein, is sent to an air flotation cell, in which the rubber particles are separated at the surface of the liquid phase and fed back to the contactor.

The outflow from the flotation cell is analysed every hour so as to determine the hydrocarbon residual content.

During 8 hours of operation, it has been found an average content of 28 mg of hydrocarbons per liter of water, 18 mg of which are ethylbenzene.

This effluent is sent to a second contact-flotation stage, having the same characteristics, also containing 500 mg of rubber treated with formic acid. The average content of the resulting effluent has been found equal to 12 mg of hydrocarbons per liter of water, from which 8 mg is ethylbenzene.

EXAMPLES 11 (COMPARATIVE) AND 12

We make use of a mixture of waste products from tire casings made of natural or synthetic rubber, having a density of 1.15 and an average gum content of 60%, crushed to particles from which only those having a size from 0.1 to 1 mm are used.

In example 11, an emulsion of one gram of gas oil in 1 liter of water is stirred for 5 hours with 50 mg of rubber particles as above-defined. The residual hydrocarbon concentration in water amounts to 805 mg per liter of water, which corresponds to an absorption power of 3.9 g of hydrocarbons per gram of rubber.

In example 12, we proceed in the same manner with the use of 50 mg of identical particles except that they are treated preliminarily for 2 hours at ordinary temperature with 10 ml of 2 N sulfuric acid. No sulfonation occurs under these conditions. The residual concentration, at that time, amounts to 580 mg of hydrocarbons per liter of water, which corresponds to an absorption power of 8.4 g of hydrocarbons per gram of rubber.

EXAMPLE 13

500 ml of water containing 10 g of formic acid is stirred for 30 minutes at 80° C. with 50 g of particles of conventional vulcanized natural rubber containing 75% of gum, the particles having a size from 0.1 to 1 mm.

After filtration and draining, 228 g of swollen rubber particles are recovered.

EXAMPLE 14

10 g of raw untreated rubber particles, identical to those used in example 13, are introduced into a glass syringe, maintained vertical and provided with a plate of filter paper for retaining the particles.

In the absence of the syringe piston, we introduce gas-oil from the top, so that, after saturation of the rubber, the level in the syringe is 5 ml above the rubber particles.

After 10 minutes, we insert the piston in the syringe while leaving air above the gas-oil and we slowly push the piston into the syringe until it reaches the level of the rubber particles, so as to expell the gas-oil contained in the interparticle space and to replace it with air.

It is observed that 18.5 g of gas-oil is thus absorbed, which corresponds to a capacity of 1.85.

The same experiment is repeated with 10 g of swollen rubber particles obtained as in example 13 and which thus correspond to 2.19 g of raw particles swollen with 7.81 g of aqueous solution. It is observed that 11.15 g of gas-oil has been absorbed, which corresponds to a capacity of 5.10 with respect to the weight of the raw particles.

EXAMPLE 15

20 g of particles of swollen rubber as in example 13 are dried in air up to a weight of 10 g, which corresponds to 4.38 g of raw particles swollen with 5.62 g of aqueous solution.

By proceeding as in example 14, the absorption power is found to be 3.05 with respect to the weight of raw particles.

EXAMPLE 16

We proceed like in example 13 with the use of 50 g of rubber particles similar to those used in this example, and 500 ml of an aqueous solution containing 15 g of acetic acid.

After filtration and draining, we recover 217 g of swollen particles. The absorption power of said particles, determined according to the test described above in example 14, is found equal to 4.97 with respect to the weight of raw particles.

EXAMPLE 17

We proceed like in example 13 with the use of an emulsion of 30 g of oleic acid in 500 ml of water and while stirring for 1 hour.

After filtration and draining, there is recovered 161 g of swollen particles whose power to absorb gas-oil amounts to 3.75 times the weight of raw particles.

EXAMPLE 18

We stir for 45 minutes at 80° C., 50 g of particles of a size from 0.2 to 0.8 mm, obtained by cryogenic crushing of used tires automobile cars, with 500 ml of water containing 10 g of formic acid. After filtration and draining, 80 g of particles are recovered.

The capacity of said particles to absorb gas-oil was found equal to 1.43 with respect to the weight of the raw particles, the absorption power of the latter being equal to 0.80.

EXAMPLE 19

We stir for 30 minutes at 80° C., 50 g of particles of vulcanized cellular natural rubber of a 40% gum content, having a size from 0.5 to 1.5 mm, with 500 ml of water containing 12 g of a raw mixture of acids having from 1 to 12 carbon atoms, obtained by oxidation of a $C_{10}$–$C_{13}$ paraffin cut.

After filtration and draining, 155 g of swollen particles are recovered.

The capacity of these particles to absorb gas-oil is equal to 3.37 times the weight of the raw particles, the absorption power of the latter being equal to 2.05.

We claim:

1. A process for absorbing a hydrocarbon or an organic solvent, which process comprises contacting said hydrocarbon or solvent with an absorption mass consisting essentially of rubber particles previously subjected to a process of treating said rubber particles with a solution or dispersion consisting essentially of an acid, with the additional condition that, when the acid is sulfuric acid, non-sulfonating conditions are used for said treatment, said solution or dispersion being of sufficient acidity and said treatment being conducted for a sufficient time to yield a resultant rubber having a larger capacity for absorbing hydrocarbon or an organic solvent than untreated rubber.

2. A process according to claim 1, wherein the material to be adsorbed is a hydrocarbon.

3. A process according to claim 2, in which the particles consist of crushed vulcanized rubber particles of a size from 0.1 to 3 mm.

4. A process according to claim 2, in which the treatment with an acid is conducted at a temperature from 0° to 150° C. with a substantially anhydrous organic acid, or an inorganic acid.

5. A process according to claim 2, in which the acid is hydrochloric acid, sulfuric acid, nitric acid, substantially anhydrous formic acid or substantially anhydrous acetic acid.

6. A process according to claim 2, in which the acid is an organic acid in aqueous solution or emulsion having a concentration of about 0.1–10 mols per liter of water.

7. A process according to claim 2, wherein the acid is sulfuric acid and the non-sulfonating conditions include a concentration of 0.1–10 mols per liter of water, a temperature of about 0°–100° C. and a treatment time of about 15 minutes to 3 hours.

8. A process according to claim 2, in which the acid is an organic acid in aqueous solution or emulsion, and the treatment results in the substantial swelling of the rubber.

9. A process according to claim 8, in which the organic acid is a mono- or dicarboxylic acid having from 1 to 20 carbon atoms per molecule.

10. A process according to claim 8, in which the organic acid is acetic acid or formic acid.

11. A process according to claim 8, in which the aqueous solution or emulsion contains from 0.1 to 80% by weight of organic acid.

12. A process according to claim 8, in which the aqueous solution or emulsion contains a weight of organic acid corresponding to at least 10% by weight of the rubber.

13. A process according to claim 8 wherein the organic acid is formic acid, acetic acid, trichloroacetic acid, propionic acid, trifluoroacetic acid or butyric acid.

14. The process of claim 2, wherein the hydrcarbon is present as an aqueous solution or emulsion.

15. The process of claim 14, wherein the hydrocarbon content is from 20 mg to 2 grams per liter of water.

16. The process of claim 14, wherein said contacting of the hydrocarbon solution or emulsion with the absorption mass is conducted by stirring particles of said absorption mass in the aqueous solution or emulsion, followed with separating the particles from the resultant purified water.

17. The process of claim 14, wherein said contacting of the hydrocarbon solution or emulsion with the absorption mass is conducted by passing said solution or emulsion through a fixed bed of particles of said absorption mass.

18. A process according to claim 2, in which the acid is an inorganic acid in aqueous solution having a concentration of about 0.1–10 moles per liter of water.

19. A process according to claim 1, wherein the acid is sulfuric acid and the non-sulfonating conditions include a concentration of 0.1–10 mols per liter of water, a temperature of about 0°–100° C. and a treatment time of about 15 minutes to 3 hours.

20. The process of claim 1, wherein the rubber is vulcanized.

21. A process according to claim 1, wherein the acid is an organic acid, or an inorganic acid selected from the group consisting of hydrofluoric acid, hydrochloride acid, hydrobromic acid, hydroiodic acid, sulfuric acid, phosphoric acid and nitric acid.

22. A process according to claim 21, wherein the organic acid is formic acid, acetic acid, trichloroacetic acid, propionic acid, trifluoroacetic acid or butyric acid.

23. A process according to claim 1, further comprising washing the resultant treated mass with water, and then drying same.

24. A process for absorbing a hydrocarbon, which comprises contacting said hydrocarbon with an absorption mass consisting essentially of rubber particles previously subject to a process of treating said rubber particles with an aqueous solution or emulsion consisting essentially of an organic acid and 10 to 80% by wieght of polyol ester, said solution or dispersion being of sufficient acidity and said treatment being conducted for a sufficient time to yield a resultant substantially swollen rubber having a larger capacity for absorbing hydrocarbon than untreated rubber.

25. A process according to claim 24, wherein the aqueous solution or emulsion contains 0.1 to 80% by weight of organic acid.

26. A process according to claim 24, wherein said organic acid has a concentration of about 0.1–10 moles per liter of water.

* * * * *